United States Patent Office 3,492,227
Patented Jan. 27, 1970

3,492,227
DRILLING FLUID
Jack H. Kolaian, Houston, Tex., assignor to Texaco Inc., New York, N.Y., a corporation of Delaware
No Drawing. Filed Apr. 25, 1967, Ser. No. 633,402
Int. Cl. C10m 3/26, 3/04
U.S. Cl. 252—8.5                    6 Claims

ABSTRACT OF THE DISCLOSURE

An aqueous drilling fluid dispersant and a method of drilling wells using said drilling fluid which contains as the dispersant 2,4-dinitro-1,3-dihydroxybenzene.

---

This invention relates to a novel aqueous drilling fluid for drilling wells through sub-surface formations by means of well drilling tools, and particularly to such an aqueous well drilling fluid having improved dispersibility as a result of containing therein a novel dispersant as hereinafter more fully described. The invention is also concerned with a method of drilling wells employing the novel aqueous drilling fluid.

Drilling fluids, or muds as they are sometimes called, are slurries of clayey solids used in the drilling of wells for tapping underground collections of oil, gas, brine or water. Such fluids have a number of different functions, the most important of which are to assist in the removal of cuttings from the well, to seal off formations of gas, oil or water which may be encountered at different levels, to lubricate the drilling tool and drill pipe which carries the tool, and to hold the cuttings in suspension in event of shut-downs in drilling.

An ideal drilling fluid is a thixotropic colloidal system, i.e., a fluid which on agitation or circulation (as by pumping or otherwise), has a measurable relatively low viscosity and is free flowing (not plastic), particularly at high temperatures; but when such agitation or circulation is halted, the fluid sets or gels. The rate of gel formation is such as to permit the cuttings to fall only a short distance before the gel structure is sufficiently strong to support them.

When such a drilling fluid having the proper viscosity, the proper gel rate and proper gel strength is circulated through a well bore, it has a sufficiently high viscosity to carry the cuttings and sand from the bottom of the hole to the surface and it has a gel rate such as to allow the cuttings and sand to settle in a settling pit. On standing in a quiescent state, it develops sufficient gel strength to prevent the settling of the cuttings, sand or weighting material, etc., in the well bore when it becomes necessary to discontinue circulation for any appreciable period of time. Such a fluid is also characterized by its ability to form a mud cake on the borehole wall, thereby assisting in sealing off the traversed formations and inhibiting so-called water loss, i.e., loss of water from the drilling fluid.

One of the principal problems in mud chemistry is the production of suitable drilling fluids having satisfactory dispersibility, and the necessary thixotropic properties discussed above.

In accordance with the present invention the problems of dispersibility in aqueous drilling fluids can be solved by incorporating in an aqueous drilling fluid as the dispersant 2,4-dinitro-1,3-dihydroxybenzene in an amount sufficient to reduce the viscosity thereof.

It is surprising that this compound is an effective drilling fluid dispersant when 1-hydroxy-2,4-dinitronaphthalene is an ineffective drilling fluid dispersant.

It is known from the article appearing in Zhur. Priklad. Khem. 35, pages 638–647 (1962), "Organic Viscosity Reducer in Clay Solutions" by D. Tischenko and S. Fleisher (CA, 57, 2491g, 1962), that the ortho-dihydroxybenzene-sulfonic acids, the ortho-dihydroxy-alpha-toluenesulfonic acids and water soluble salts thereof are viscosity reducing agents in clay laden drilling fluids whereas the corresponding meta- and para-dihydroxybenzenes including the corresponding sulfonic acid derivatives and water soluble salts thereof are ineffective viscosity reducing agents for aqueous drilling fluids.

The 2,4-dinitro-1,3-dihydroxybenzene of the present invention may be added to an aqueous drilling fluid in amounts ranging from about 0.1 pound to about 10 pounds per barrel of drilling fluid. In general, it has been found that amounts less than 0.1 pound per barrel do not produce completely satisfactory results in terms of dispersing activity whereas amounts above about 10 pounds per barrel are economically unattractive and no improved results are obtained therewith. A preferred range for the 2,4-dinitro-1,3-dihydroxybenzene of the present invention is from about 0.25 to about 5 pounds per barrel of drilling fluid for most consistent results and efficiency.

The 2,4-dinitro-1,3-dihydroxybenzene employed in the present invention is a known compound and the manner of its preparation is known in the art.

In the table, gel strength (gels) is reported as determined by a shearometer in accordance with the procedure in the American Petroleum Institute publication RP–29, results being expressed either as pounds/100 square feet or as time in seconds for a tube to settle in the mud (after the mud has stood for zero time and for 10 minutes). If it settles in more than 60 seconds, shear is reported as pounds per hundred square feet. Yield point (YP) is calculated by subtracting the plastic viscosity (PV) from the Fann viscosity reading at 300 r.p.m. Plastic viscosity (PV) is obtained by calculation, subtracting the Fann reading at 300 r.p.m. from the 600 r.p.m. reading. Apparent viscosity (AV) is equal to one half of the Fann viscosity reading obtained at 600 r.p.m. The fluidity of a mud can be back calculated from these data, the results being expressed in Fann viscosity at 600 r.p.m. and 300 r.p.m. for a direct reading viscosimeter.

The properties of the base mud are shown in the table.

The test data set forth in the following table indicates the surprising advantages resulting by the use of 2,4-dinitro-1,3-dihydroxybenzene as the dispersant in the drilling fluid of the present invention and demonstrate the beneficial results of same in improving the dispersibility of drilling fluids.

Representative physical properties of drilling fluids both before and after addition of various materials including the 2,4-dinitro-1,3-dihydroxybenzene of the present invention are shown in the table. In each example the amount of material or materials added to the base muds, if any, are shown, expressed in terms of pounds of material per barrel of drilling fluid.

TABLE

| Ex. | Type Mud | Amount and Type Dispersant | PV | YP | Ap. Vis., cpe. | Shearometer Gels, lb./100 ft.² | | pH | API W.L., cc. | Time, hrs. |
|-----|----------|---------------------------|----|----|-----|-----|-----|----|------|------|
| | | | | | | 0¹ | 10¹ | | | |
| 1 | LpH [a] | 0.5 A [b] | 16 | 8 | 20 | 0¹ | 3.1 | 9.4 | 16.6 | 2 |
| | | | 20 | 8 | 24 | | | | | 16 |
| 1a | | 2.0 A | 11 | 5 | 13.5 | 0¹ | 0⁶ | 9.4 | 16.8 | 2 |
| | | | 16 | 3 | 17.5 | | | | | 16 |
| I | LpH | 0.5 B [c] | 17 | 32 | 33 | 11 | 20 | 9.6 | 14.2 | 2 |
| | | | 15 | 33 | 31.5 | | | | | 16 |
| Ia | | 2.0 B | 7 | 35 | 24.5 | 8.5 | 19 | 9.6 | 15.2 | 2 |
| | | | 18 | 28 | 32 | | | | | 16 |

[a] LpH = Low pH Mud.
[b] A = 2,4-dinitro-1,3-dihydroxybenzene.
[c] B = 1-hydroxy-2,4-dinitronaphthalene.

The data in the above table Examples 1 and 1a show that 2,4-dinitro-1,3-dihydroxybenzene is an excellent drilling fluid dispersant in aqueous low pH systems as demonstrated by the very low yield point and gel strength values obtained therewith.

The table also shows (Examples I and Ia) that the compound 1-hydroxy-2,4-dinitronaphthalene is an ineffective dispersant as is evidenced by the high yield point, apparent viscosity and gel strength values obtained in the drilling fluid containing same.

I claim:
1. An aqueous drilling fluid containing clayey solids and as the dispersant 2,4-dinitro-1,3-dihydroxybenzene in an amount sufficient to impart a reduced viscosity thereto.
2. An aqueous drilling fluid as claimed in claim 1 wherein 2,4-dinitro-1,3-dihydroxybenzene is present in the drilling fluid in an amount of from 0.1 to 10 pounds per barrel of drilling fluid.
3. An aqueous drilling fluid as claimed in claim 2 wherein 2,4-dinitro-1,3-dihydroxybenzene is present in the drilling fluid in an amount of from 0.25 to 5 pounds per barrel of drilling fluid.
4. In a method of drilling wells wherein a drilling fluid is passed through the well in contact with earth formations, during the drilling operation, the improvement which comprises contacting said earth formations with an aqueous drilling fluid containing clayey solids and at least 0.1 pound per barrel of drilling fluid of 2,4-dinitro-1,3-dihydroxybenzene, said dihydroxybenzene being present in the drilling fluid in an amount sufficient to impart a reduced viscosity thereto.
5. In a method of drilling wells as claimed in claim 4 wherein 2,4-dinitro-1,3-dihydroxybenzene is present in the drilling fluid in an amount of from 0.1 to 10 pounds per barrel of drilling fluid.
6. In a method of drilling wells as claimed in claim 5 wherein 2,4-dinitro-1,3-dihydroxybenzene is present in the drilling fluid in an amount of from 0.25 to 5 pounds per barrel of drilling fluid.

References Cited

UNITED STATES PATENTS

| | | | |
|---|---|---|---|
| 1,999,766 | 4/1935 | Lawton et al. | 252—8.5 |
| 3,189,596 | 6/1965 | Brink | 252—8.5 X |
| 3,293,177 | 12/1966 | Stratton | 252—8.5 |

OTHER REFERENCES

Tishchenko et al., organic viscosity depressants for drilling fluids, article in Journal of Applied Chemistry of the U.S.S.R., vol. 35, No. 3, March 1962, pages 611 to 619.

HERBERT B. GUYNN, Primary Examiner

U.S. Cl. X.R.

252—351